(12) United States Patent
Park et al.

(10) Patent No.: US 8,890,865 B2
(45) Date of Patent: Nov. 18, 2014

(54) IMAGE PROCESSING APPARATUS AND METHOD FOR SUBPIXEL RENDERING

(71) Applicant: Samsung Electronics Co., Ltd., Suwon-si (KR)

(72) Inventors: Ju Yong Park, Seongnam-si (KR); Dong Kyung Nam, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 170 days.

(21) Appl. No.: 13/688,502

(22) Filed: Nov. 29, 2012

(65) Prior Publication Data

US 2013/0135299 A1 May 30, 2013

(30) Foreign Application Priority Data

Nov. 30, 2011 (KR) .................. 10-2011-0126734
Jul. 6, 2012 (KR) .................. 10-2012-0074188

(51) Int. Cl.
| | |
|---|---|
| *G06T 15/00* | (2011.01) |
| *G02B 27/00* | (2006.01) |
| *H04N 13/00* | (2006.01) |
| *H04N 13/04* | (2006.01) |
| *G02B 27/22* | (2006.01) |

(52) U.S. Cl.
CPC ............ *G06T 15/00* (2013.01); *G02B 27/0093* (2013.01); *H04N 13/0037* (2013.01); *H04N 13/0033* (2013.01); *H04N 13/0422* (2013.01); *G02B 27/2214* (2013.01); *H04N 13/0402* (2013.01); *H04N 13/0468* (2013.01)
USPC ............................................ 345/419; 348/78

(58) Field of Classification Search
CPC ..................... G02B 27/2214; G09G 3/2074
USPC ............................................. 345/419; 348/78
See application file for complete search history.

(56) References Cited

U.S. PATENT DOCUMENTS

| | | | |
|---|---|---|---|
| 8,154,587 B2 | 4/2012 | Fukushima et al. | |
| 8,531,454 B2 * | 9/2013 | Fukushima et al. | 345/419 |
| 2005/0078370 A1 * | 4/2005 | Nishihara et al. | 359/464 |
| 2008/0079805 A1 * | 4/2008 | Takagi et al. | 348/51 |
| 2010/0118127 A1 | 5/2010 | Nam et al. | |
| 2010/0171697 A1 | 7/2010 | Son et al. | |
| 2011/0096156 A1 * | 4/2011 | Kim et al. | 348/59 |
| 2011/0102423 A1 | 5/2011 | Nam et al. | |
| 2011/0304612 A1 * | 12/2011 | Ohyama | 345/419 |
| 2012/0169731 A1 | 7/2012 | Fukushima et al. | |

FOREIGN PATENT DOCUMENTS

| | | |
|---|---|---|
| EP | 1 906 680 | 11/2007 |
| JP | 2010-91887 | 4/2010 |
| KR | 1999-0069140 | 9/1999 |

(Continued)

OTHER PUBLICATIONS

PCT International Search Report dated Nov. 30, 2012 in PCT International Application No. PCT/KR2012/010339.

*Primary Examiner* — Maurice L McDowell, Jr.
(74) *Attorney, Agent, or Firm* — Staas & Halsey LLP

(57) ABSTRACT

An image processing method and apparatus for subpixel rendering is provided. A display, with an image processing apparatus, may adjust a pixel value of a subpixel based on the position of the subpixel relative to a position of an eye of a viewer. The image processing apparatus may display a three-dimensional (3D) image on a light field display, based on the adjusted pixel value of the subpixel.

44 Claims, 14 Drawing Sheets

(56) References Cited

FOREIGN PATENT DOCUMENTS

| KR | 10-2008-0051365 | 2/2008 |
| KR | 10-2010-0017786 | 2/2010 |
| KR | 10-2011-0020762 | 3/2011 |
| KR | 10-2011-0049039 | 5/2011 |

\* cited by examiner

IMAGE PROCESSING APPARATUS AND METHOD FOR SUBPIXEL RENDERING

CROSS-REFERENCE TO RELATED APPLICATIONS

This application claims the priority benefit of Korean Patent Application No. 10-2011-0126734, filed on Nov. 30, 2011, and Korean Patent Application No. 10-2012-0074188, filed on Jul. 6, 2012, in the Korean Intellectual Property Office, the disclosures of which are incorporated herein by reference.

BACKGROUND

1. Field

One or more embodiments relate to an image processing apparatus and method, and more particularly, to an image processing apparatus and method that may render a subpixel based on a viewing position of a viewer.

2. Description of the Related Art

Three-dimensional (3D) image display apparatuses for displaying different images to both eyes of a human are classified into a stereoscopic type and an autostereoscopic type. A stereoscopic display filters a desired image through image division using a polarized light, time division, a wavelength division for differentiating a wavelength of a primary color, and the like, so that a 3D effect may be provided to a viewer when the viewer wears appropriately designed glasses that similarly filter a different divided image to each eye. An autostereoscopic display may enable differing images to be viewed within predetermined space, using a parallax barrier or a lenticular lens. The autostereoscopic display has an advantage of alleviating an inconvenience of having to wear glasses that are necessary with stereoscopic displays.

In particular, the autostereoscopic display may include a display that reproduces a general light field representing plural underlying light fields reproducing selectively different images observable from different directions, for example, to produce the 3D effect.

SUMMARY

In one or more embodiments there is provided a display apparatus, including a light field determining unit to identify a first light field to be presented to a viewer, based on a determined position of the viewer to be viewing content to be displayed on a display, and a light field converting unit to convert the identified first light field into a light field associated with the content to be displayed on the display based on the determined position of the viewer.

In one or more embodiments there is provided a display apparatus, including a representative ray determining unit to determine a representative ray of a subpixel included in a display, based on a determined position of a viewer, a reference information determining unit to determine reference information based on the determined position of the viewer and a position of the subpixel, and a subpixel rendering unit to adjust a signal level of the subpixel based on the representative ray and the reference information.

In one or more embodiments there is provided a display method, including identifying a first light field to be presented to a viewer, based on a determined position of the viewer to be viewing content to be displayed on a display, and converting the identified first light field into a light field associated with the content to be displayed on the display based on the determined position of the viewer.

In one or more embodiments there is provided a display method, including determining a representative ray of a subpixel included in a display, based on a determined position of a viewer, determining reference information based on the determined position of the viewer and a position of the subpixel, and adjusting a signal level of the subpixel based on the representative ray and the reference information.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
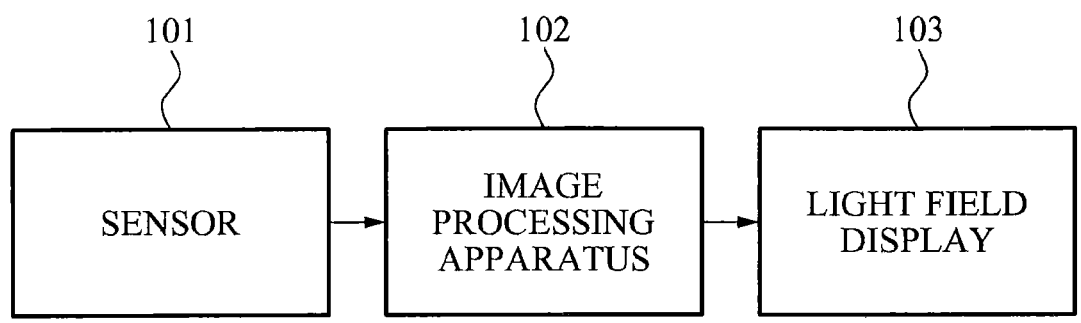
FIG. 1 illustrates a display apparatus, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Though autostereoscopic displays provide, as discussed above, benefits over stereoscopic displays, there is found a selective desire for rendering technology that may broaden a viewing area while curtailing a degradation of resolution in the autostereoscopic display, and for providing natural disparity in all directions, for example, forwards, backwards, leftwards, rightwards, upwards, and downwards. It is further found that autostereoscopic displays also have disadvantages in that a great number of views may be desired to broaden a viewing area, and that the quality of an image may be remarkably decreased at a position outside of a determined optimal viewing distance.

Herein, in one or more embodiments, the display may include an integral imaging display that may reproduce a general light field, in addition to a multiview display that may display at least three view images, as only examples. Similar to a real object which generates or reflects lights in various directions from a point on the surface of the object, the integral imaging display may reproduce rays or fields of light in various directions with parallax producing images. The integral imaging display may enable a natural image to be viewed without constraints on a viewing distance. However, there is found that disadvantages may include that the integral imaging display may fail to display a solid when a sufficient amount of light in various directions are not secured, and it is found that it may be difficult to provide natural movement disparity when intervals among the directions are not sufficiently narrow.

It is further found that securing a viewing area may be problematic. In one or more embodiments, an interval between rays, or fields of rays, may be less than or equal to a predetermined level to display a natural scene in the integral imaging display. However, it is found that an increase in the number of rays, to broaden the viewing area and to maintain the interval, may result in a decrease in resolution. It is found that a multiview display may have a limit of displaying an image since rays displaying respectively different views in different directions may be viewed by a viewer at a position outside of an optimal viewing distance or position. As to the number of rays, it is also found that the multiview display may also have a problem in that a narrow interval between rays may be desired for smooth image conversion, and a number of rays required to expand the viewing area may cause a decrease in resolution.

FIG. 1 illustrates a display apparatus, according to one or more embodiments. The display apparatus may include a sensor 101, an image processing apparatus 102, and a light field display 103, for example. Herein, the term apparatus should be considered interchangeable with the term system as, depending on embodiment, the described elements may be included in a single enclosure, or plural enclosures each with one or more of the described elements. Accordingly, the sensor 101 may be internal or external to the image processing apparatus 102, and similarly, the image processing apparatus 102 may be internal or external to the display apparatus that includes the light field display 103.

Figure 4:
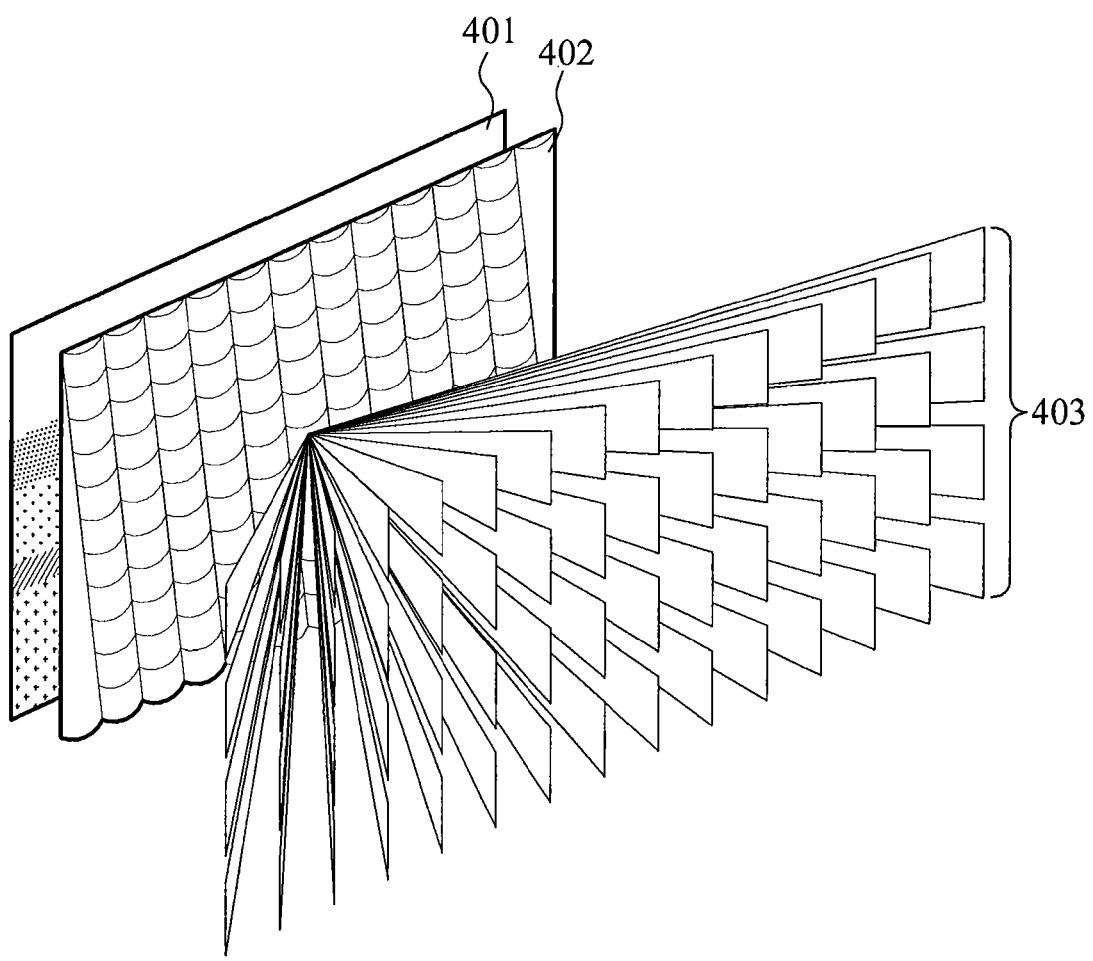
FIG. 4 illustrates a light field display, e.g., of a display apparatus, outputting rays in a plurality of directions, according to one or more embodiments.

Briefly, with regard to the light field display 103 and as only an example, FIG. 4 demonstrates an outputting of such a light field display. FIG. 4 illustrates a light field display outputting rays in a plurality of directions, according to one or more embodiments. Below, FIGS. 4-6 and 8-9 will be briefly discussed within the discussion of FIG. 1 to provide additional explanation of terms used hereinafter.

Figure 8:
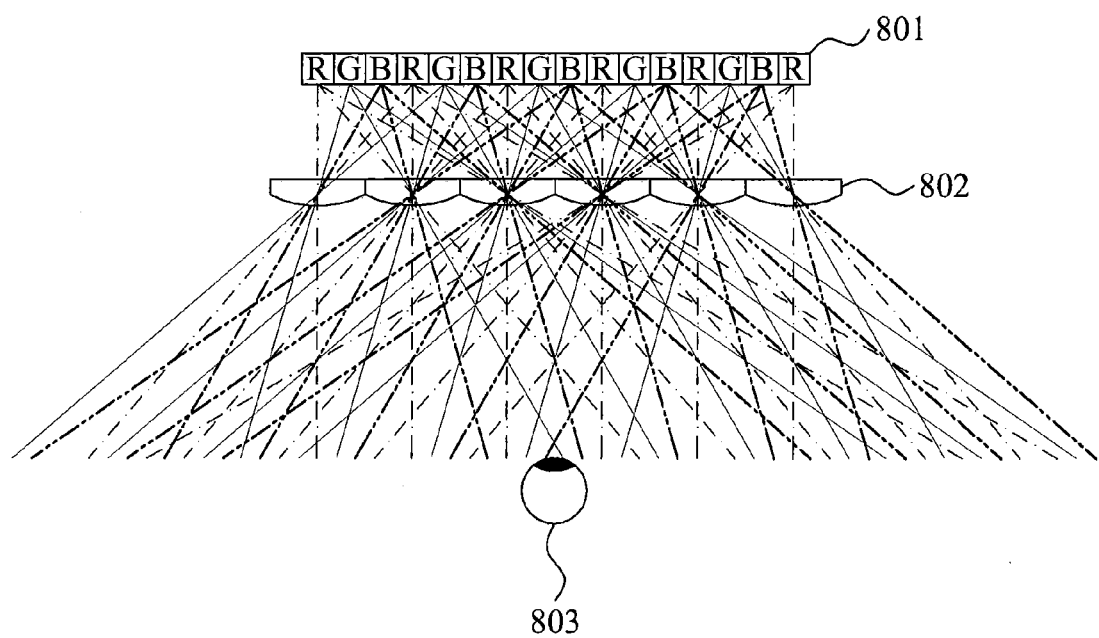
FIG. 8 illustrates a result of passing central rays output from subpixels through an optical filter, according to one or more embodiments.

Referring to FIG. 4, a light field display may include a panel 401 including a plurality of subpixels. Rays of light from respective subpixels may pass through an optical filter 402. Here, the optical filter 402 may include a lenticular lens, a parallax barrier, a micro lens array, or the like. However, the following one or more embodiments are not limited to the optical filter 402, and may include all types of optical filters that may be disposed in front of or behind a display. In this instance, the optical filter 402 may include 3D pixels through which rays 403 output from each of the plurality of subpixels pass. That is, when the optical filter 402 is disposed in front of the display, the at least one ray 403 output from each of the plurality of subpixels may enter a single 3D pixel. In an embodiment, there may be plural subpixels whose rays are configured to pass through the single 3D pixel, such as illustrated in FIG. 8, as only an example. The rays 403 that are output from each of the plurality of subpixels may be emitted through the 3D pixel. When the optical filter 402 is disposed behind the display, rays output from a single 3D pixel may enter at least one subpixel. The rays passing through each of the at least one subpixel may be emitted externally in a predetermined direction. Through the process described above, the light field display may present a 3D image.

For example, rays 403 may be output from a single 3D pixel included in the optical filter 402, in 15×4 directions. That is, the single 3D pixel may output the rays 403 having different information, in multiple directions, and 3D pixels may present points in a 3D space. In an embodiment, as only an example, the 15 horizontal directions may represent 15 potential parallaxes in the horizontal direction, and the 4 vertical directions may represent 4 potential parallaxes in the vertical direction, noting that alternatives are equally available. Potentially, in such an embodiment, a different parallax image may be projected by each of rays 403 for such an example single 3D pixel.

As illustrated in FIG. 4, rays 403 may in effect have respective widths that expand during through their traversal, such that at a particular point in space in front of the display light from one or more rays 403 may be respectively observed with different respective potential intensities depending on where the observation is performed. In an example where the optical filter 402 is a lenticular lens array, if a subpixel produced beam of light with a particular luminance is incident to a central location of a particular lens of the lenticular lens array, the beam of light may progress through that particular lens with minimal refraction and a larger maintained luminance than if that subpixel produced beam of light was incident to a periphery portion of the particular lens that would more substantially refract the subpixel produced beam of light with less maintained luminance. In one or more embodiments, a subpixel produced beam of light that progresses through/past an optical filter 402, as only an example, with such minimal luminance loss and/or minimal refraction, such as when the optical filter 402 is a lenticular lens, may be referred to as a central ray as that beam of light would represent a maximum intensity of light output from the subpixel.

Again, using FIG. 8 as only an example, there are demonstrated plural central rays that may progress from each subpixel through respective lenses of the optical filter 802, e.g., when the optical filter 802 is a lenticular lens array. In an embodiment, as only an example, FIG. 8 demonstrates that there may be a group of 12 subpixels whose beams of light may each be considered to be capable of producing central rays through particular single lenses, or 3D pixels represented by optical filter 802, as only an example. FIG. 8 further demonstrates that central rays from different lenses or 3D pixels, as only examples, even for the same color, may be potentially observable by an eye of a viewer, depending on their resultant respective luminance levels, which may be utilized in one or more embodiments, such as in the discussion regarding FIG. 15.

Accordingly, referring back to FIG. 4, a direction in which central rays are output from a subpixel included in the panel 401 of the display progress may be predetermined based on the optical filter 402. Among the central rays for which the direction is predetermined, there may be a determination of which central ray is identical to or most similar to identified reference information that depends on relative positions of the subpixel and an eye of a viewer that may observe that central ray. In FIG. 4, when central rays output from a subpixel included in the panel 401 of the display progress through a 3D pixel of the optical filter 402, one of the central rays output through the 3D pixel may be determined to be a reference or representative ray. In this instance, in FIG. 4, the rays 403 that progress through the 3D pixel may be referred to as central rays, and one of the rays 403 may be determined to be a representative ray based an ultimate proximity of observable light from that one ray 403 and a position of the eye of the viewer. Rendering of the subpixel may then be performed based on the determined representative ray.

Figure 5:
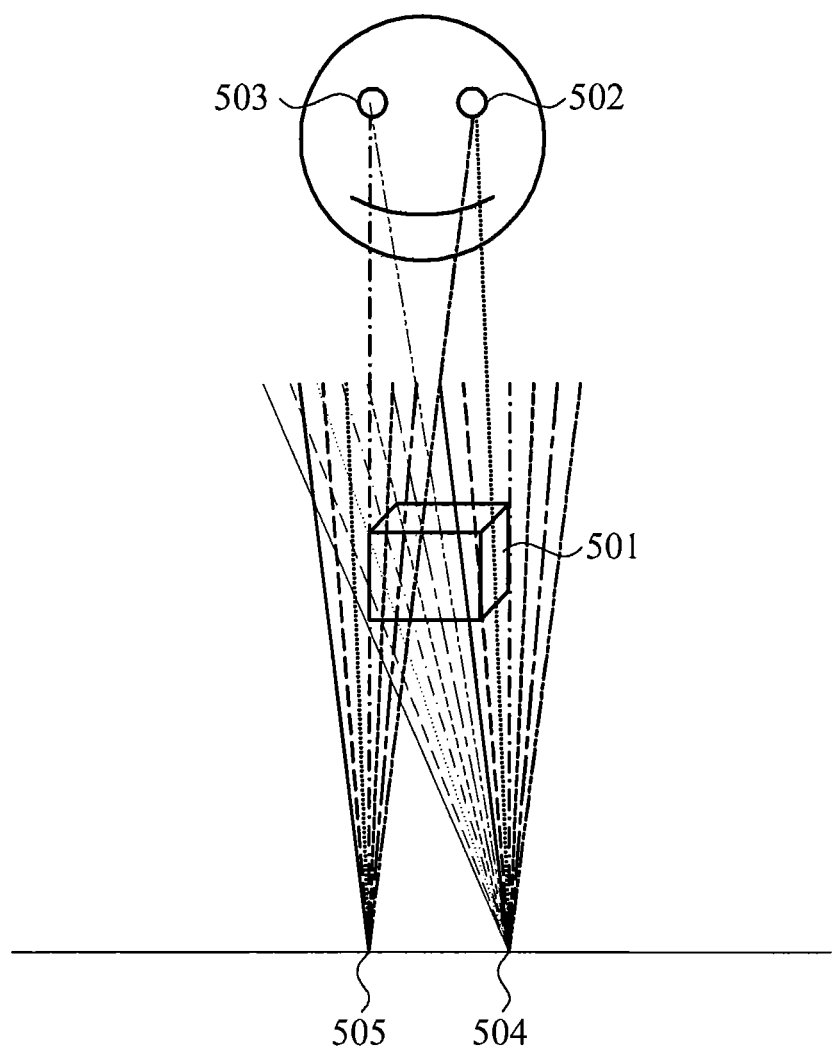
FIG. 5 illustrates an example of rays output from two 3D pixels of a display along a horizontal direction, and as observed by a left eye and a right eye of a viewer, according to one or more embodiments.

Briefly, and as only a further example, FIG. 5 illustrates rays output from two 3D pixels of a display, along a horizontal direction, and their observance by a left eye and a right eye of a viewer, according to one or more embodiments.

Referring to FIG. 5, when a viewer views an object 501 in a 3D space with a left eye 502 and a right eye, a 3D pixel 504 and a 3D pixel 505 may generate rays in multiple directions. Rays output through the 3D pixel 504 and the 3D pixel 505 may be visible to the left eye 502 and the right eye 503.

In reality, among the rays output through the 3D pixel 504 and the 3D pixel 505, a ray that reaches the left eye 502 of the viewer directly, or reaches a position most adjacent to the left eye 502, may be determined to be a representative ray of the 3D pixel 504 and the 3D pixel 505, with respect to the left eye 502. Conversely, among the rays output through the 3D pixel 504 and the 3D pixel 505, a ray that reaches the right eye 503 of the viewer directly, or reaches a position most adjacent to the right eye 503, may be determined to be a representative ray of the 3D pixel 504 and the 3D pixel 505, with respect to the right eye 503.

As further illustration, and as only an example, FIG. 8 illustrates a result of central rays from subpixels progressing through an optical filter, according to one or more embodiments.

Referring to FIG. 8, central rays may be output from a subpixel 801 included in a display. A central ray may be output in a direction such that a maximum level of brightness is observable by a viewer, among rays output from the subpixel 801. That is, an ultimate progressed direction of the central ray, e.g., being passed an optical filter 802, may refer to an optimal viewing direction with respect to the subpixel 801. In this instance, at least one central ray may be output from the subpixel 801.

The central rays output from the subpixel 801 may pass through the optical filter 802, for example, a parallax barrier, or a lenticular lens. The central rays passing through the optical filter 802 may ultimately be perceived by an eye 803 of a viewer. The 3D pixel described above may correspond to a position at which the central rays progress through the optical filter 802.

In this instance, an image processing apparatus may determine, among the central rays output from the subpixel 801 included in the display, a representative ray corresponding to a central ray that may be perceived by the viewer, based on the position of the eye of the viewer. Here, again, the representative ray may be determined from among the central rays based on the predetermined central ray directions, e.g., predetermined by the optical filter 820. When the optical filter 820 is not provided, the representative ray may be determined from among the central rays output from the subpixel 801. A representative ray may be determined independently for each subpixel.

Figure 9:
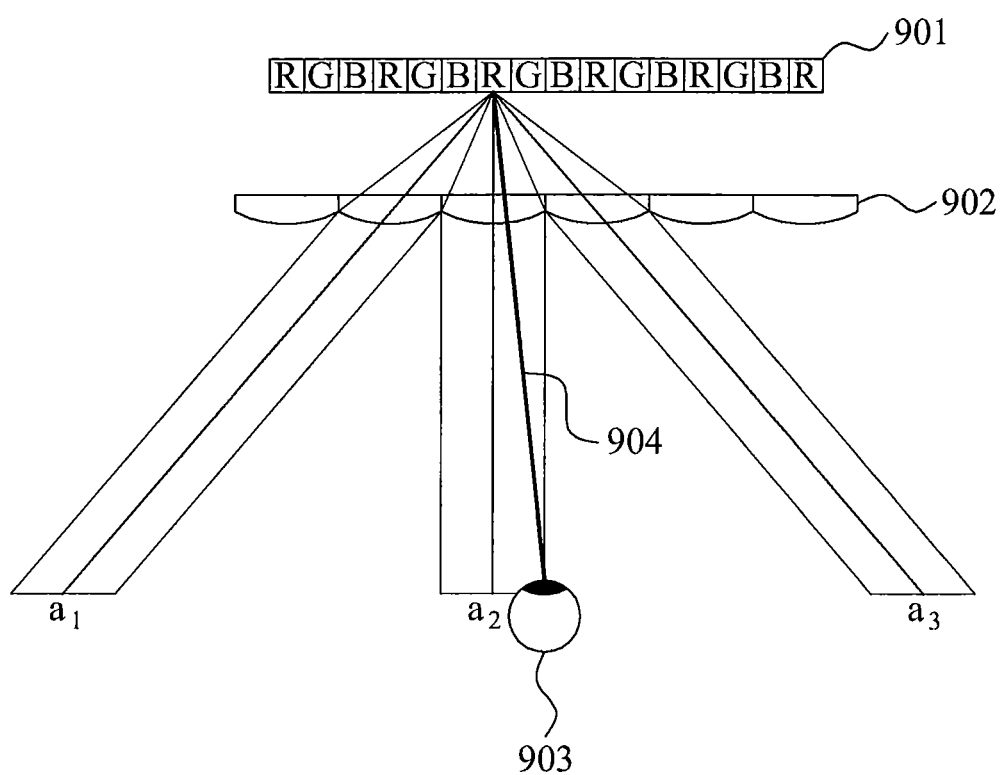
FIG. 9 illustrates a process of determining a representative ray among central rays output from a subpixel, according to one or more embodiments.

As a further illustration, and as only an example, FIG. 9 illustrates a process of determining a representative ray among central rays output from a subpixel, according to one or more embodiments.

Referring to FIG. 9, a plurality of central rays may be output from a red subpixel 901 among a set of subpixels. In this instance, respective directions in which the output central rays progress may be determined when the rays pass through an optical filter 802 of a display. In a case of three central rays $a_1$, $a_2$, and $a_3$ being output from the red subpixel 901, a central ray determined to be perceived by a viewer may correspond to the central ray $a_2$. That is, a particular central ray output from a subpixel may be observable by an eye 903 of the viewer, while other central rays output from the subpixel may not be observable, or as observable, by the eye 903 of the viewer.

As noted, although the central ray $a_2$ fails to reach the eye 903 of the viewer directly, the viewer may perceive the central ray $a_2$ due to a width of the central ray $a_2$. Again, the central ray may correspond to a ray indicating a maximum level of brightness that may be perceived by the viewer, such that, although the central ray fails to reach the eye 903 of the viewer directly, some of the light from the central ray having a brightness of a reduced level may actually reach the eye 903 of the viewer, due to the resultant width of the central ray.

Accordingly, an image processing apparatus may identify the central ray $a_2$ as being the representative ray for the red subpixel 901. Here, as the viewer moves, and a position of the eye 903 of the viewer changes, the representative ray of the red subpixel 901 may again change. Through the process described above, the image processing apparatus may track the position of the eye 903 of the viewer in real time, and may determine representative rays with respect to all subpixels included in the display, based on the tracked position of the eye 903 of the viewer.

Referring back to FIG. 1, the sensor 101 may measure a position of an eye of a viewer viewing content through the light field display 103. In this instance, the sensor 101 may include a camera that may calculate three-dimensional (3D) spatial coordinates (x, y, z) by capturing the eye of the viewer. For example, the camera may include at least one of at least one visible band camera, at least one infrared camera, and at least one depth camera. In this instance, the camera may be inserted in the light field display 103, or may be attached to or detached from the light field display 103. In one or more embodiments, when an eye is determined to be in a detectable space as a result of detecting a 3D position of the eye, a 3D image may be viewed freely, irrespective of an optimal viewing distance, by adaptively rendering a subpixel to be viewed at the 3D position. Also, crosstalk between rays caused by rays adjacent to a desired ray may be prevented.

The image processing apparatus 102 may generate plural pixel signals/values representing differing images to be simultaneously, for example, displayed to a viewer for the 3D image effect, and/or adjust such generated plural pixel signals/values to present a view image corresponding to a light field suitable for the detected position of the eye of the viewer.

As only an example, with further reference to FIG. 9, the image processing apparatus may render the red subpixel 901, based on a difference between the representative ray $a_2$, and reference information 904 corresponding to a virtual line connecting the eye 903 of the viewer and the red subpixel 901. In particular, a pixel value of the red subpixel 901 may be adjusted, based on a difference between an angle of the representative ray $a_2$, and an angle of the virtual line connecting the eye 903 of the viewer and the red subpixel 901.

Figure 6:
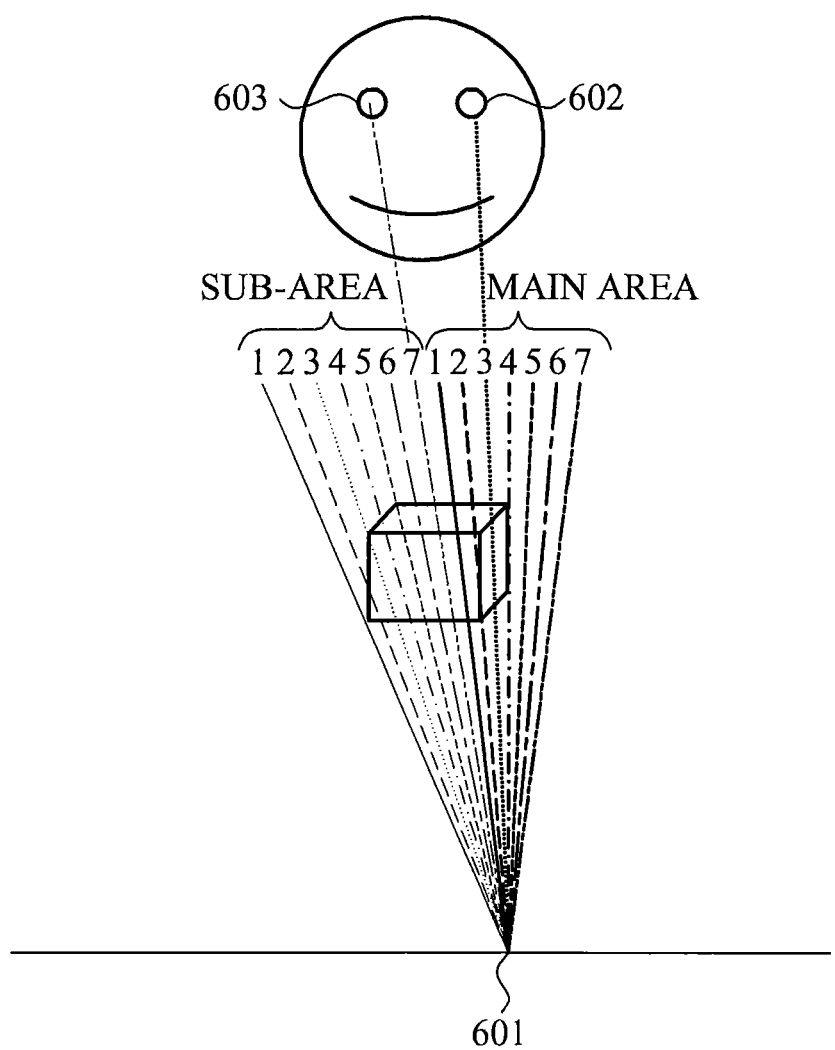
FIG. 6 illustrates an example of rays output from a single 3D pixel of a display, along a horizontal direction, and observed by a left eye and a right eye of a viewer, according to one or more embodiments.

Briefly, and as only an example, FIG. 6 illustrates rays output from a single 3D pixel of a display, along a horizontal direction, and their observance by a left eye and a right eye of a viewer, according to one or more embodiments.

Referring to FIG. 6, when rays are output from a single 3D pixel 601, a portion of rays corresponding to a parallax main area may reach a left eye 602 of a viewer. In this instance, a portion of rays corresponding to a parallax sub-area may reach a right eye 603 of the viewer. That is, FIG. 6 represents a display apparatus having a narrow main area, so that an actual viewing angle is broadened by configuring a light field using rays corresponding to parallax sub-areas that may be formed repetitively adjacent to the main area. FIG. 6 also illustrates which ray is visible to the left eye 602 or the right eye 603 of the viewer, among the rays output from the single 3D pixel 601. When rays visible to both eyes of the viewer are determined with respect to all 3D pixels included in the display, an image processing apparatus may determine an image visible to both eyes of the viewer.

In other words, when a position of the eye of the viewer is determined, the image processing apparatus may identify a ray visible to the eye of the viewer. The image processing apparatus may assign a proper pixel value to the ray visible to the eye of the viewer, based on the position of the eye, thereby enabling the viewer to view a natural 3D image.

Referring back to FIG. 1, the image processing apparatus 102 may identify which light field corresponds to the position of the eye of the viewer, i.e., which view image the should be seen by the viewer. The image processing apparatus 102 may convert the identified light field into a light field that may be presented by the light field display 103. In this instance, the process of converting the light field may refer to a sampling process to be performed to present a greater number of light fields using a small number of light fields that may be presented by the light field display 103. Here, the process of adjusting of the plural pixel signals/values, discussed herein in one or more embodiments, may be incorporated into the generating of the plural pixel signals/values, or may be implemented before or after the consideration of different images that are to be displayed by the light field display to generate the 3D effect.

Finally, the converted light field may be displayed on the light field display 103. The viewer may view a desired 3D image through the light field display 103, irrespective of a viewing position. That is, although the viewer moves to another position, and views content, the image processing apparatus 102 may present a view image suitable for the changed position of the viewer.

Figure 2:
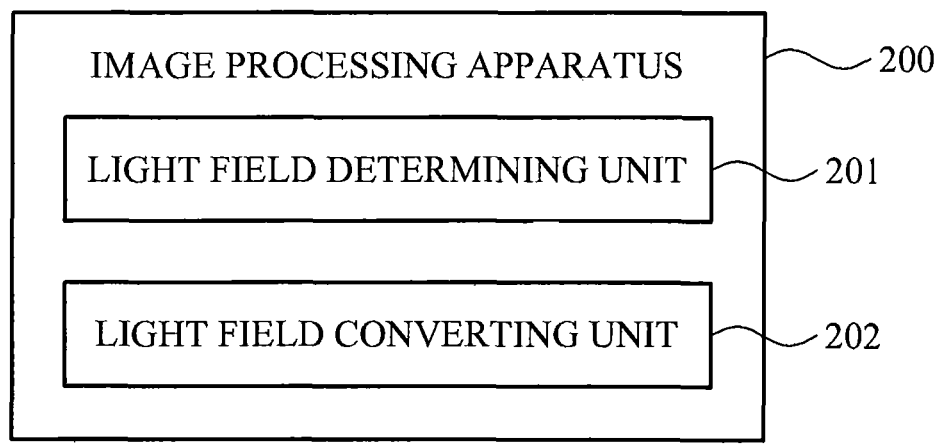
FIG. 2 illustrates an image processing apparatus, according to one or more embodiments.

FIG. 2 illustrates an image processing apparatus 200, such as the image processing apparatus 102, according to one or more embodiments.

Referring to FIG. 2, the image processing apparatus 200 may include a light field determining unit 201 and a light field converting unit 202, for example.

The light field determining unit 201 may identify which light field corresponds to the position of the eye of the viewer, i.e., which view image should be seen by the viewer. For example, the light field determining unit 201 may identified the light field using a representative ray, as discussed above, corresponding to a central ray that may be perceived by the viewer, among central rays output from a subpixel included in the display, based on the position of the eye of the viewer. In one or more embodiments, the position of the eye of the viewer may be tracked continuously, for example, such as by the sensor 101 of FIG. 1.

Thus, the central ray may refer to a ray in a direction for optimal viewing, among rays output from the subpixel, and the representative ray may refer to a central ray that is most observerable by the eye of the viewer based on the position of the user, among the central rays of the subpixel, even if the viewer moves to another position. That is, at least one central ray output from the subpixel may refer to a candidate group for a representative ray to be determined based on the position of the eye of the viewer. When the direction of central rays output from the subpixel are predetermined by the optical filter disposed in front of the display, a representative ray may be selected from among the central rays output in the predetermined direction. When central rays output from the subpixel are determined to be output in at least one direction based on a direction of a ray generated from the optical filter disposed behind the display, a representative ray may be selected from among the central rays corresponding to the at least one direction.

Accordingly, the light field converting unit 202 may convert the identified light field into a light field associated with content to be displayed on the display based on the position of the eye of the viewer. For example, the light field converting unit 202 may generate reference information of the subpixel, based on the position of the subpixel included in the display, and the position of the eye of the viewer. The light field converting unit 202 may convert the identified light field into the light field associated with content to be displayed on the display, using the reference information and the representative ray. Since the light field to be physically displayed on the display may be limited, it may be desired that the identified light field, which may be perceived by the viewer, be converted to the light field associated with content to be displayed on the display. In this instance, the displayed light field may be selected from contents to be displayed into multiple view images.

In particular, the light field converting unit 202 may convert the identified light field into the light field associated with content to be displayed on the display, based on a determined difference between an angle of the representative ray and an angle of the reference information corresponding to a virtual line connecting the position of the subpixel and the position of the eye of the viewer. In this instance, the reference information of the subpixel may include reference information based on a horizontal position of the subpixel and a horizontal position of the eye of the viewer. Also, the reference information of the subpixel may include reference information based on a vertical position of the subpixel and a vertical position of the eye of the viewer.

In this instance, the process of converting the identified light field may be performed by rendering a subpixel. In particular, the process of converting the identified light field may be performed based on the angle of the reference information and the angle of the representative ray. The light field converting unit 202 may adjust a brightness value for each pixel, by applying the difference between an angle of the virtual line and the angle of the representative ray to visibility information set for each subpixel. The processing of converting the identified light field may be performed in real time with respect to both a left eye and a right eye of the viewer.

In particular, the representative ray may refer to one of central rays output from the subpixel, and indicating an optimal level of brightness. When the reference information based on the position of the subpixel and the position of the eye of the viewer does not correspond to the representative ray, the light field converting unit 202 may render the subpixel, by increasing visibility information corresponding to a maximum brightness value set for each subpixel. That is, the light field converting unit 202 may increase the brightness value of the subpixel when the difference between the reference information and the representative ray increases. Here, an actual signal value may be increased within a limited range. Accordingly, when the brightness value of the subpixel is increased to a maximum value, an original brightness value of the subpixel may be maintained. When the brightness value of the subpixel is increased to a value less than the maximum value, the brightness value of the subpixel may be reduced in proportion to a case in which the brightness value of the subpixel is increased to the maximum value.

Depending on one or more embodiments, the image processing apparatus 200 may correct color distortion that may occur when a first light field is converted into a finite number of second light fields. In addition, the image processing apparatus 200 may correct luminance non-uniformity, for example, luminance moiré, on a screen, and the like which may occur when the first light field is converted into a finite number of second light fields.

Figure 3:
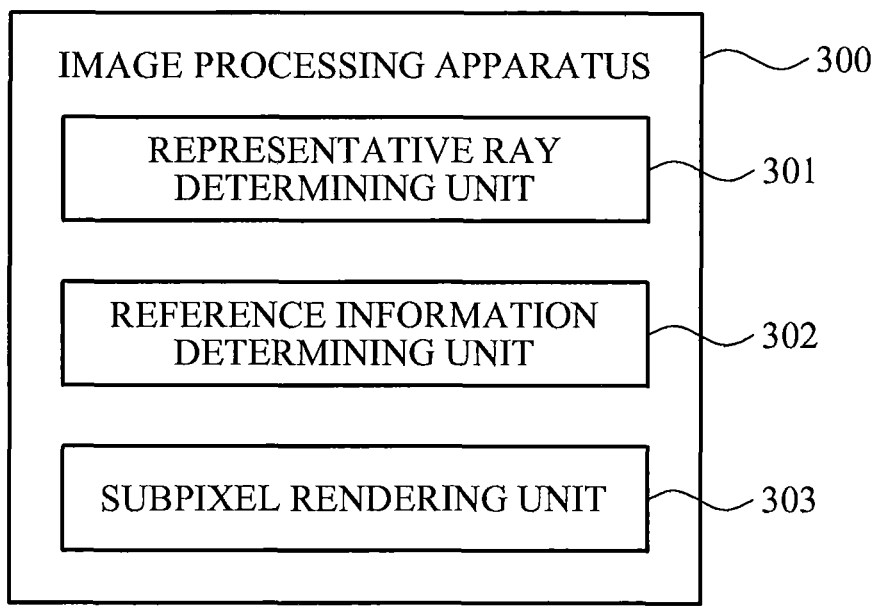
FIG. 3 illustrates an image processing apparatus, according to one or more embodiments.

FIG. 3 illustrates an image processing apparatus 300, according to one or more embodiments.

Referring to FIG. 3, the image processing apparatus 300 may include a representative ray determining unit 301, a reference information determining unit 302, and a subpixel rendering unit 303, for example.

The representative ray determining unit 301 may determine a representative ray of a subpixel included in a display, based on a position of an eye of a viewer. For example, the representative ray determining unit 301 may determine, among central rays output from the subpixel through an optical filter, a central ray that may be perceived by the viewer to be the representative ray, based on the position of the eye of the viewer.

Here, the central ray may be output from the subpixel through the optical filter, in a direction indicating a maximum level of brightness. The representative ray may include a central ray that is identical to or most adjacent to a direction from a position of the subpixel to the position of the eye of the viewer, i.e., a central ray of the subpixel that is observed the most by the eye of the viewer even if not directly incident on the eye of the viewer.

The reference information determining unit 302 may determine reference information, based on the position of the subpixel and the position of the eye of the viewer. For example, the reference information determining unit 302 may determine a virtual line connecting the position of the subpixel and the position of the eye of the viewer to be the reference information. In this instance, the reference information determining unit 302 may determine the reference information, using at least one of a virtual line connecting a horizontal position of the subpixel and a horizontal position of the eye of the viewer, and a virtual line connecting a vertical position of the subpixel and a vertical position of the eye of the viewer.

The subpixel rendering unit 303 may adjust a signal level of the subpixel, using the representative ray and the reference information. For example, the subpixel rendering unit 303 may adjust the signal level of the subpixel, based on a difference between an angle of the representative ray and an angle of the reference information. The subpixel rendering unit 303 may adjust a brightness value of each subpixel, by applying the difference between the angle of the representative ray, and an angle of a virtual line corresponding to the reference information to visibility information set for each subpixel. The process of rendering the subpixel may be performed in real time with respect to both a left eye and a right eye of the viewer.

The subpixel rendering unit 303 may adjust the signal level of the subpixel with respect to the left eye of the viewer or the right eye of the viewer, based on whether content displayed through the subpixel is visible to at least one of the left eye and the right eye of the viewer.

Figure 7:
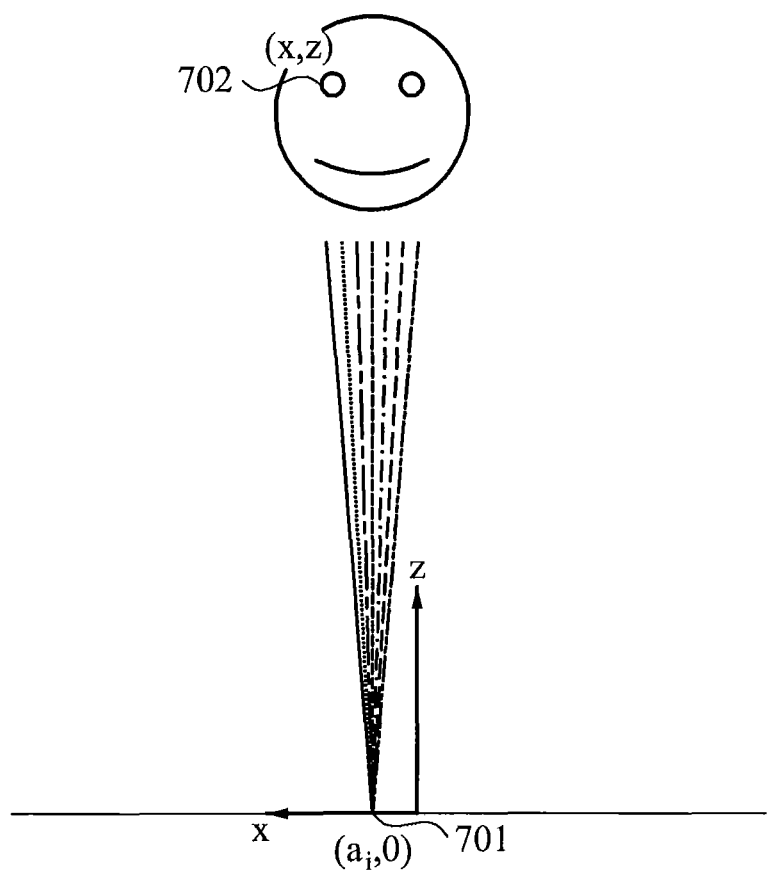
FIG. 7 illustrates a process of adjusting a signal level of a subpixel, using a 3D pixel included in a display, e.g., along a horizontal direction, according to one or more embodiments.

FIG. 7 illustrates a process of adjusting a signal level of a subpixel, using a 3D pixel, e.g., included in a display, along a horizontal direction, according to one or more embodiments.

A process of rendering a subpixel in view of a position of an eye of a viewer will be described in greater detail below based on a 3D pixel. In this instance, the process of rendering the subpixel may refer to a process of adjusting a signal level of the subpixel.

In FIG. 7, it may be assumed that coordinates of a 3D pixel 701 correspond to $(a_i, 0)$, and coordinates of a right eye 702 of the viewer correspond to $(x, z)$. In this instance, a gradient of a straight line connecting the 3D pixel 701 and the right eye 702 may be determined based on the below Equation 1, for example.

$$\alpha_i = \frac{x - a_i}{z} \qquad \text{Equation 1}$$

In Equation 1, $\alpha_i$ denotes the gradient of the straight line connecting the 3D pixel 701 and the right eye 702. An image processing apparatus may determine a ray visible to the right eye 702 of the viewer, among rays output from the 3D pixel 701, using the gradient $\alpha_i$. The image processing apparatus may determine a subpixel presenting the ray visible to the right eye 702 of the viewer. In addition, the image processing apparatus may determine a value to be assigned to the subpixel, based on a difference between the gradient $\alpha_i$ and a gradient of the ray visible to the right eye 702 of the viewer. Here, the rays output from the 3D pixel 701 may be central rays indicating a maintenance of a maximum level of brightness in the 3D pixel 701, and thus, the central ray visible to the right eye 702 of the viewer may be referred to as a representative ray of the 3D pixel 701.

The image processing apparatus may determine a subpixel $p_i$ outputting a ray that is most similar to the gradient $\alpha_i$, based on the below Equation 2, for example.

$$p_i = f_p(\alpha_i) \qquad \text{Equation 2:}$$

In Equation 2, $f_p$ denotes a function that determines the subpixel $p_i$.

A degree of adjusting a signal level of the subpixel $p_i$ occurring due to the difference between the gradient $\alpha_i$ and the gradient of the ray output from the 3D pixel positioned at $(a_i, 0)$ may be determined, based on the below Equation 3, for example.

$$r_i = f_r(\alpha_i) \qquad \text{Equation 3:}$$

Content $c_i$ displayed on the display based on the gradient $\alpha_i$ may be determined, based on the below Equation 4, for example.

$$c_i = f_c(\alpha_i) \qquad \text{Equation 4:}$$

In reality, the subpixel $p_i$ included in the display may be determined based on the degree $r_i$ of adjusting the signal level of the subpixel $p_i$, and a value corresponding to the position of the subpixel $p_i$ in the content $c_i$, based on the below Equation 5, for example.

$$V(p_i) = V_c(c_i, p_i, r_i) \qquad \text{Equation 5:}$$

The above description is provided for a case in which the display only a horizontal disparity may be present. When both the horizontal disparity and a vertical disparity are present in the display, a similar description may be applied, as follows.

A gradient $\beta_i$ of a straight line connecting a 3D pixel positioned at $(0, b_i)$ in the display disposed in a vertical direction, and the right eye 702 of the viewer may be determined, based on the below Equation 6, for example.

$$\beta_i = \frac{y - b_i}{z} \qquad \text{Equation 6}$$

A pixel $p_i$ outputting a ray that is most similar to the gradient $\alpha_i$ derived using Equation 1, and the gradient $\beta_i$ derived using Equation 6 may be determined by the image processing apparatus, based on the below Equation 7, for example.

$$p_i = f_p(\alpha_i, \beta_i) \qquad \text{Equation 7:}$$

In Equation 7, $f_p$ denotes a function that determines the subpixel $p_i$. A degree $r_i$ of adjusting a signal level of the subpixel $p_i$ occurring due to a difference between the gradient $\alpha_i$ and the gradient $\beta_i$, and a gradient of a ray passing through a 3D pixel positioned at $(a_i, b_i)$ may be determined, based on the below Equation 8, for example.

$$r_i = f_r(\alpha_i, \beta_i) \qquad \text{Equation 8:}$$

Content $c_i$ displayed on the display based on the gradient $\alpha_i$ and the gradient $\beta_1$ may be determined based on the below Equation 9, for example.

$$c_i = f_c(\alpha_i, \beta_i) \qquad \text{Equation 9:}$$

In reality, the subpixel $p_i$ included in the display may be determined based on the degree $r_i$ of adjusting the signal level of the subpixel $p_i$, and a value corresponding to the position of the subpixel $p_i$ in the content $c_i$, based on the below Equation 10, for example.

$$V(p_i) = V_c(c_i, p_i, r_i) \qquad \text{Equation 10:}$$

The operation processes described above may be performed independently with respect to all 3D pixels constituting the display when the position of the eye of the viewer is determined. Accordingly, a processing rate may be improved through parallel processing of the operation processes.

Referring again to FIG. 8, for example, an image processing apparatus may determine, among the central rays output from the subpixel 801 included in the display, a representative ray corresponding to a central ray that may be perceived by the viewer, based on the position of the eye of the viewer. Here, the representative ray may be determined from among the central rays for which a direction to progress is determined through the optical filter 820. When the optical filter 820 is not provided, the representative ray may be determined from among the central rays output from the subpixel 801. A representative ray may be determined independently for each subpixel. In this instance, whether a central ray reaches an area that may be perceived by the viewer may be determined based on a position of the optical filter 802 that the central ray output from the subpixel 801 may pass through.

Referring again to FIG. 9, a plurality of central rays may be output from a red subpixel 901 among a set of subpixels. In this instance, a direction in which the output central rays progress may be determined when the rays pass through an optical filter 802 of a display. In a case of three central rays $a_1$, $a_2$, and $a_3$ being output from the red subpixel 901, a central ray perceived by a viewer may correspond to the central ray $a_2$.

In this instance, although the central ray $a_2$ fails to reach the eye 903 of the viewer directly, the viewer may perceive the central ray $a_2$ due to a width of the central ray $a_2$. That is, although the central ray fails to reach the eye 903 of the viewer directly, an amount of light from the central ray having a brightness of a predetermined level may still reach the eye 903 of the viewer, due to a width of the central ray.

The image processing apparatus may render the red subpixel 901, based on a difference between the representative ray $a_2$, and reference information 904 corresponding to a virtual line connecting the eye 903 of the viewer and the red subpixel 901. In particular, a pixel value of the red subpixel 901 may be adjusted, based on a difference between an angle of the representative ray $a_2$, and an angle of the virtual line connecting the eye 903 of the viewer and the red subpixel 901. A process of adjusting a pixel value of a subpixel will be described in greater detail below with reference to FIGS. 11A through 15, for example.

Figure 10:
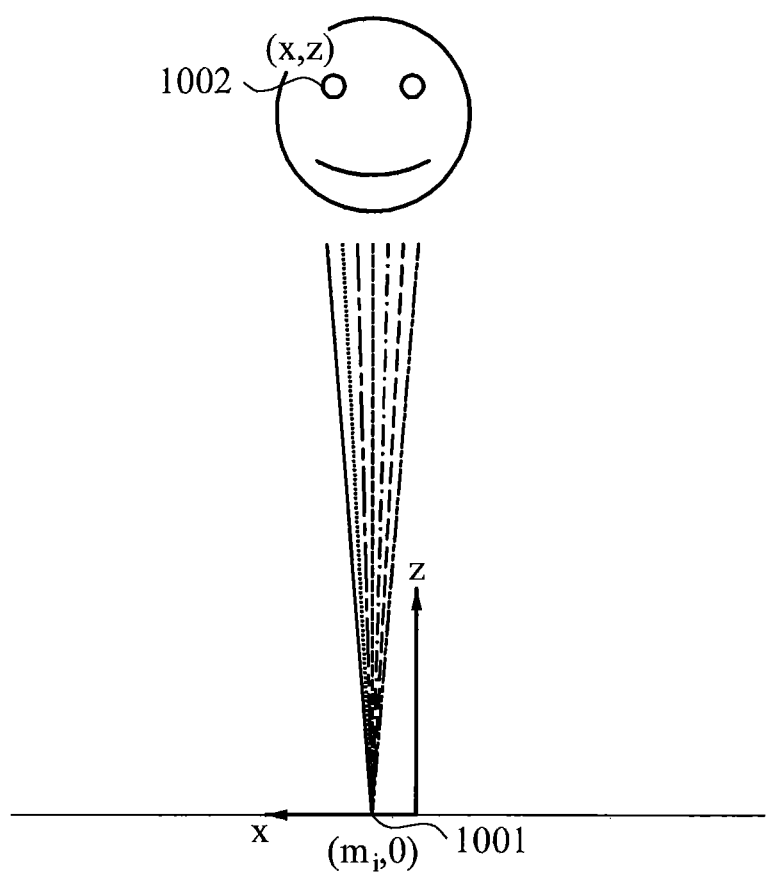
FIG. 10 illustrates a process of adjusting a signal level of a subpixel of a display, e.g., along a horizontal direction, according to one or more embodiments.
Figure 11A:
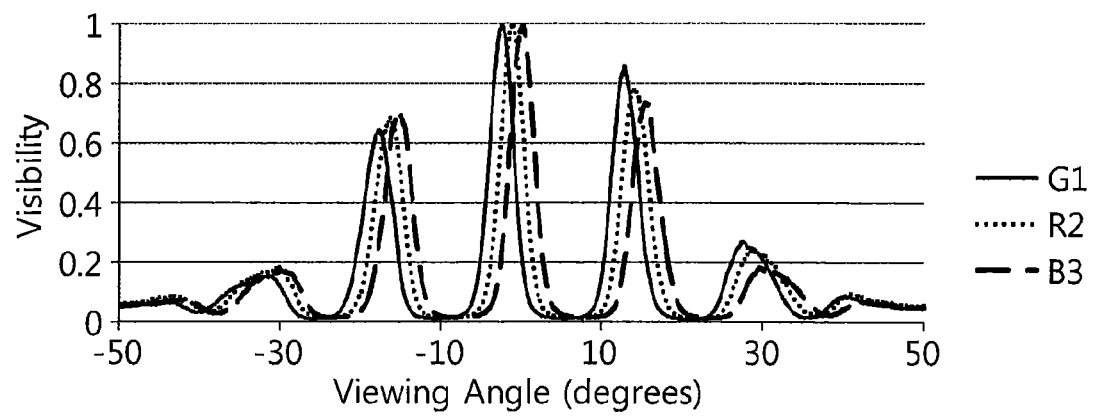
FIGS. 11A through 11D illustrate visibility graphs indicating response characteristics of subpixels, according to one or more embodiments.
Figure 11B:
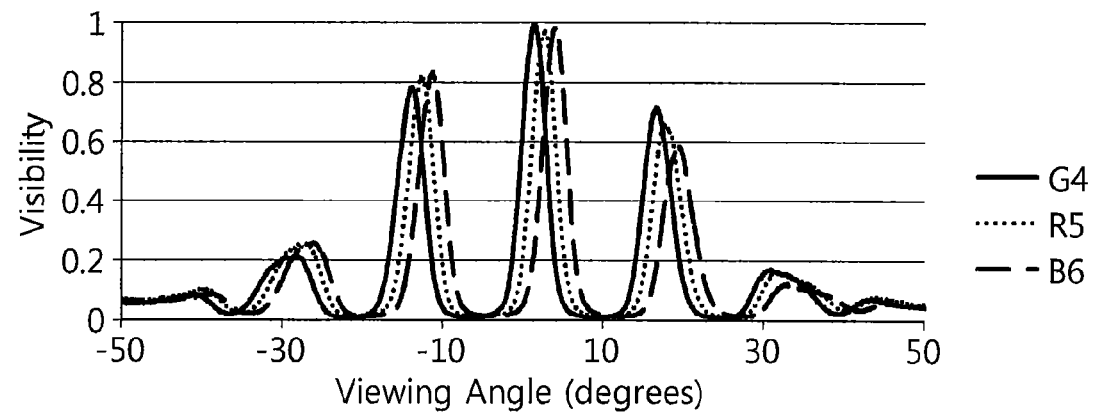
Figure 11C:
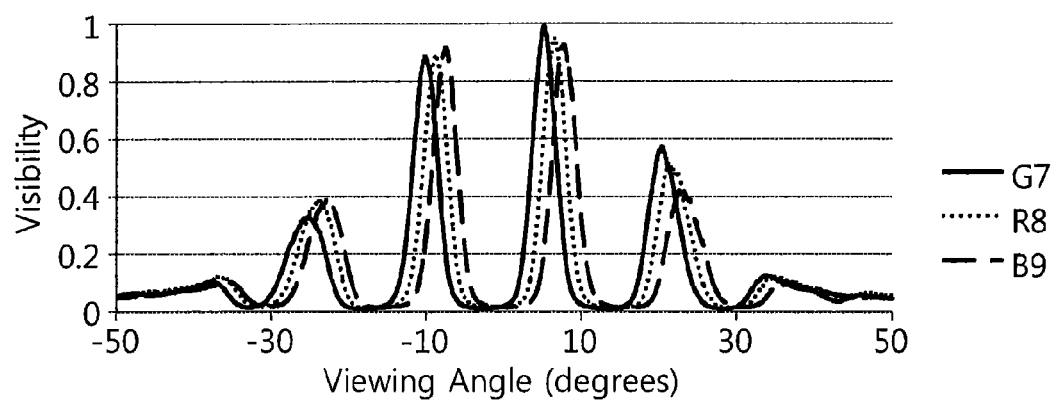
Figure 11D:
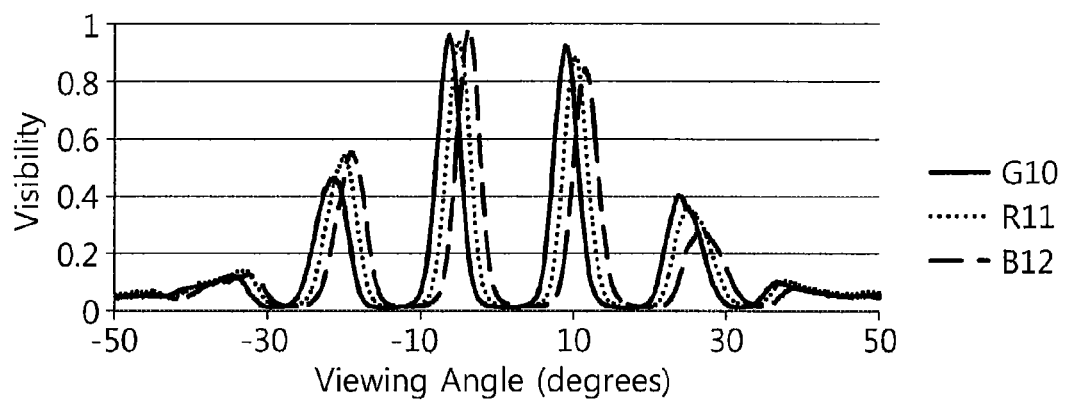

FIG. 10 illustrates a process of adjusting signal level of a subpixel, using a subpixel of a display, along a horizontal direction, according to one or more embodiments.

A process of rendering a subpixel in view of a position of an eye of a viewer will be described based on a subpixel. In this instance, the process of rendering the subpixel may refer to a process of adjusting a signal level of the subpixel.

In FIG. 10, it may be assumed that coordinates of a subpixel 1001 correspond to $(m_i, 0)$, and coordinates of a right eye 1002 of the viewer correspond to $(x, z)$. In this instance, a gradient of a straight line connecting the subpixel 1001 and the right eye 1002 may be determined based on the below Equation 11, for example.

$$\mu_i = \frac{x - m_i}{z} \qquad \text{Equation 11}$$

In Equation 11, $\mu_i$ denotes the gradient of the straight line connecting the subpixel 1001 and the right eye 1002. In a case of a gradient being a straight line after a ray output from the subpixel 1001 passes through a closest optical filter corresponding to $\mu_{i0}$, a gradient at which the ray output from the subpixel 1001 passes through the optical filter may be expressed by $\mu_{i0} + k\delta u$. Here, k denotes an integer.

An image processing apparatus may determine which ray is visible to the right eye 1002 of the viewer, among rays output from the subpixel 1001, using the gradient $\mu_i$. Here, the rays output from the subpixel 1001 may refer to central rays indicating a maximum level of brightness in the subpixel 1001, and the ray visible to the right eye 1002 of the viewer may correspond to a representative ray $u_i$ of the subpixel

1001. The representative ray $u_i$ may be determined, based on the below Equation 12, for example.

$$u_i = f_u(\mu_i, u_{i0}, \delta u) \quad \text{Equation 12:}$$

A degree $r_i$ of adjusting a signal level of the subpixel 1001 occurring due to a difference between the gradient and the representative ray $u_i$ output from the subpixel 1001 positioned at $(m_i, 0)$ may be determined, based on the below Equation 13, for example.

$$r_i = f_r(\mu_i, u_i) \quad \text{Equation 13:}$$

Content $c_i$ displayed on the display based on the gradient $\mu_i$ may be determined, based on the below Equation 14, for example.

$$c_i = f_c(\mu_i) \quad \text{Equation 14:}$$

In reality, the subpixel 1001 included in the display may display the content $c_i$, based on the below Equation 15, for example.

$$v_i = f_v(r_i, c_i) \quad \text{Equation 15:}$$

The above description is provided for a case in which only a horizontal disparity may be present in the display. When both the horizontal disparity and a vertical disparity are present a similar description may be applied, as follows.

A gradient $v_i$ of a straight line connecting a subpixel positioned at $(0, n_i)$ in the display disposed in a vertical direction, and the right eye 1002 of the viewer may be determined based on the below Equation 16, for example.

$$v_i = \frac{y - n_i}{z} \quad \text{Equation 16}$$

In a case of a horizontal gradient being a straight line after a ray output from the subpixel 1001 passes through a closest optical filter corresponding to $\mu_{i0}$, and a vertical gradient being the straight line after the ray output from the subpixel 101 passes through the closest optical filter corresponding to $v_{i0}$, a horizontal gradient at which the ray output from the subpixel 1001 passes through the optical filter may be expressed by $\mu_{i0} + k\delta u$, and a vertical gradient at which the ray output from the subpixel 1001 passes through the optical filter may be expressed by $v_{i0} + l\delta u$. Here, k and l denote integers. In this instance, the image processing apparatus may derive $u_i$ and $v_i$ similar to the gradient $\mu_i$ and the gradient $v_i$, respectively, based on the below Equation 17, for example.

$$u_i = f_u(\mu_i, u_{i0}, \delta u)$$

$$v_i = f_v(v_i, v_{i0}, \delta v) \quad \text{Equation 17:}$$

The image processing apparatus may determine a degree $r_i$ of adjusting a signal level of the subpixel 1001, based on a difference between $u_i$ and $v_i$ similar to the gradient $\mu_i$ and the gradient $v_i$, based on the below Equation 18, for example.

$$r_i = f_r(\mu_i, v_i, u_i, v_i) \quad \text{Equation 18:}$$

Content $c_i$ displayed through the subpixel 1001 may be determined based on the below Equation 19, for example.

$$c_i = f_c(\mu_i) \quad \text{Equation 19:}$$

The image processing apparatus may determine a signal $v_i$ to be presented by the subpixel 1001, based on the degree $r_i$ of adjusting the signal level of the subpixel 1001 derived using Equation 18, and the content $c_i$ derived using Equation 19, based on the below Equation 20, for example.

$$v_i = f_v(r_i, c_i) \quad \text{Equation 20:}$$

The operation processes described above may be performed independently with respect to all 3D pixels constituting the display when the position of the eye of the viewer is determined. Accordingly, a processing rate may be improved through parallel processing of the operation processes.

The image processing apparatus may determine a signal to be presented by each pixel through the foregoing process when the position of the eye of the viewer is determined. In this instance, a signal to be presented by a subpixel may be determined independently with respect to both eyes of the viewer.

However, when a single subpixel is visible to both eyes of the viewer, that is, a signal to be finally presented by the subpixel, may be determined through a process of outputting a maximum value, a minimum value, an average value, or the like of a signal corresponding to each eye. Such a process may be determined based on the below Equation 21, for example.

$$v_i = f_{stereo}(v_{iL}, v_{iR}) \quad \text{Equation 21:}$$

Here, $v_{iL}$ denotes a pixel value of a signal to be presented by the subpixel with respect to a left eye, and $v_{iR}$ denotes a pixel value of a signal to be presented by the subpixel with respect to a right eye. $F_{stereo}$ denotes a function that derives maximum values, minimum values, or average values of the pixel value $v_{iL}$ and the pixel value $v_{iR}$. $v_i$ denotes a final signal to be presented by the subpixel with respect to both eyes.

As an example, when a pixel value of a subpixel identically visible to both eyes of the viewer is determined to be adjusted, the image processing apparatus may adjust the pixel value of the subpixel based on the greater of a pixel value $w_{iL}$ and a pixel value $w_{iR}$. For example, when $w_{iL} < w_{iR}$, the image processing apparatus may adjust the pixel value of the subpixel based on the pixel value $w_{iR}$.

In one or more embodiments, the image processing apparatus may adjust the pixel value of the subpixel based on the lesser of the pixel value $w_{iL}$ and the pixel value $w_{iR}$. For example, when $w_{iL} < w_{iR}$, the image processing apparatus may adjust the pixel value of the subpixel based on the pixel value $w_{iL}$.

In one or more embodiments, the image processing apparatus may calculate an average value of the pixel value $w_{iL}$ and the pixel value $w_{iR}$, and may adjust the pixel value of the subpixel based on the calculated average value. For example, the image processing apparatus may adjust the pixel value of the subpixel based on a relationship $$\left(\frac{w_{iL} + w_{iR}}{2}\right).$$

FIGS. 11A through 11D illustrate visibility graphs indicating response characteristics of subpixels, according to one or more embodiments.

In rendering a subpixel, a degree of adjusting a signal level of the subpixel may be determined through a distribution model of a light field corresponding to a property of a display. The degree of adjusting the signal level of the subpixel for a uniform or normalized color to be presented through the subpixel may determined through graphs of FIGS. 11A through 15.

The graphs of FIGS. 11A through 11D show response characteristics for each viewing angle of a viewer, with respect to each subpixel in a subpixel group including twelve subpixels, for example. The graphs of FIGS. 11A through 11D show visibility information derived by classifying subpixels based on identical colors, and normalizing a luminance value of each subpixel to a maximum value. In FIGS. 11A through 11D, the twelve subpixels may be classified into green subpixels G1, G4, G7, and G10, red subpixels R2, R5, R8, and R11, and blue subpixels B3, B6, B9, and B12.

Referring to FIGS. 11A through 11D, a luminance value decreases as an angle between a viewing direction of the viewer and a direction vertical to a plane of the display increases. That is, the viewer may perceive that a luminance value of a signal output through a subpixel decreases as an angle between the viewing direction of the viewer and a normal direction of the plane of the display including the subpixel increases.

In particular, referring to FIGS. 11A through 11D, a response characteristic of each subpixel may have a maximum value at every interval of about 15 degrees. An angle indicating a maximum value may be changed depending on characteristics of a display device. Here, a direction in which a response characteristic for each subpixel shows a maximum value may correspond to an optimal viewing direction of the corresponding subpixel. A ray output in a direction in which a response characteristic of a subpixel shows a maximum value may refer to a central ray. That is, in FIGS. 11A through 11D, a ray output in a direction in which visibility information is at a peak may refer to the central ray. In addition, at least one central ray may exist for each subpixel.

Figure 12:
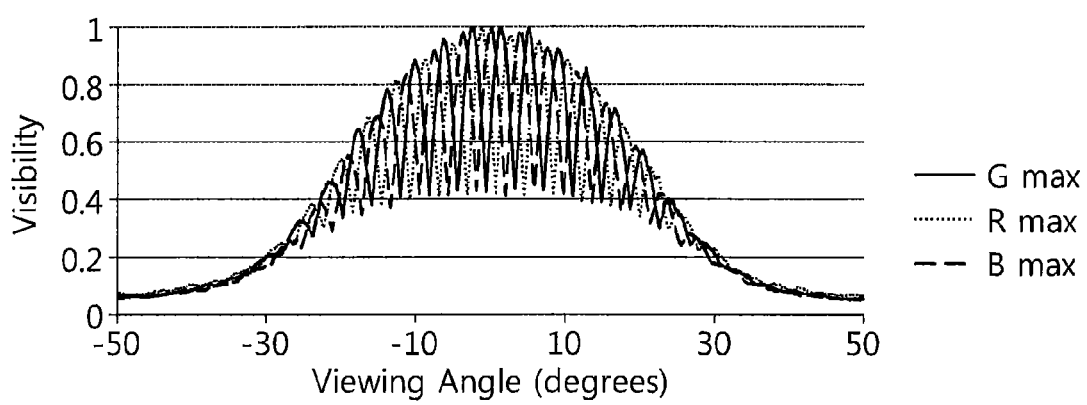
FIG. 12 illustrates a visibility graph indicating maximum values of subpixels presenting an identical color, such as for each color in the visibility graphs of FIGS. 11A through 11D, according to one or more embodiments.

FIG. 12 illustrates a visibility graph indicating maximum values of subpixels presenting an identical color, such as for each color in the visibility graphs of FIGS. 11A through 11D, according to one or more embodiments.

Referring to FIG. 12, the maximum value of the subpixels presenting the identical color may refer to a maximum normalized luminance value at a time of turning a single subpixel on with respect to a predetermined direction. Here, the predetermined direction may refer to a viewing direction in which a viewer views a subpixel. An optimal viewing direction may refer to a viewing direction in which a subpixel presents a maximum level of brightness. Thus, a subpixel having an optimal viewing direction that is identical to or most similar to the predetermined direction may be selected.

Since the maximum value of the subpixels presenting the identical color may be changed depending on a direction, correction of a luminance of a subpixel may be required. That is, when a correction process is not performed, each color may be presented to the viewer at a different brightness depending on a position of the subpixel, and colors of an image may be disposed on the display to be non-uniform.

That is, when a signal output from a subpixel is unchanged although the viewer moves, and a position of an eye of the viewer is changed, the viewer may view non-uniform colors of an image. Accordingly, adjusting the signal presented by the subpixel based on the position of the eye of the viewer may be desired, as described herein.

Figure 13:
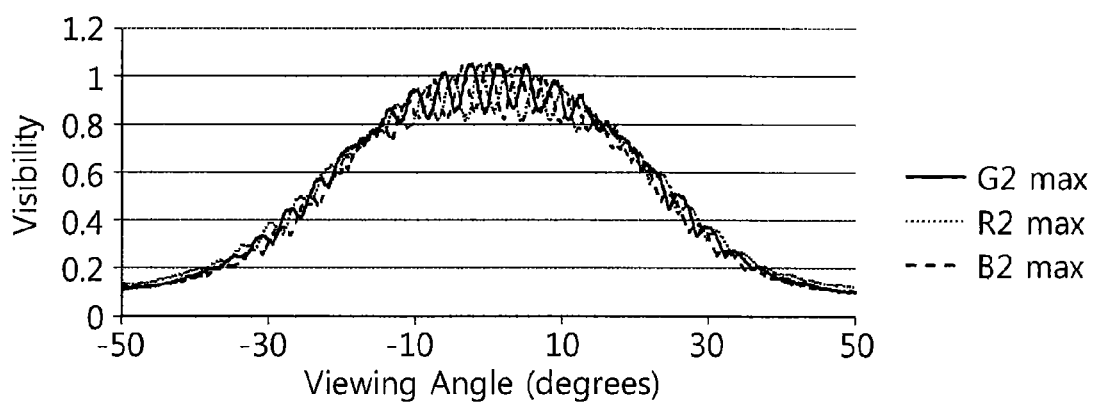
FIG. 13 illustrates a visibility graph indicating a maximum value of a sum of neighboring subpixels among subpixels presenting an identical color, such as in the visibility graphs of FIGS. 11A through 11D, according to one or more embodiments.

FIG. 13 illustrates a visibility graph indicating a maximum value of a sum of neighboring subpixels among subpixels presenting an identical color, such as in the visibility graphs of FIGS. 11A through 11D, according to one or more embodiments.

A luminance value illustrated in FIG. 13 may refer to a value at a time of turning on two pixels for which a predetermined direction is closest to an optimal viewing direction. The graph of FIG. 13 shows that the amplitude is significantly reduced when compared to the graphs of FIGS. 11A through 11D.

In order to derive color representation characteristics presented uniformly by a subpixel using characteristics of visibility information illustrated in FIGS. 12 and 13, a signal adjustment ratio for correcting a change in a signal may be used. The signal adjustment ratio may be determined based on a characteristic of the display, and may be determined by modeling the visibility information illustrated in FIGS. 12 and 13.

Figure 14:
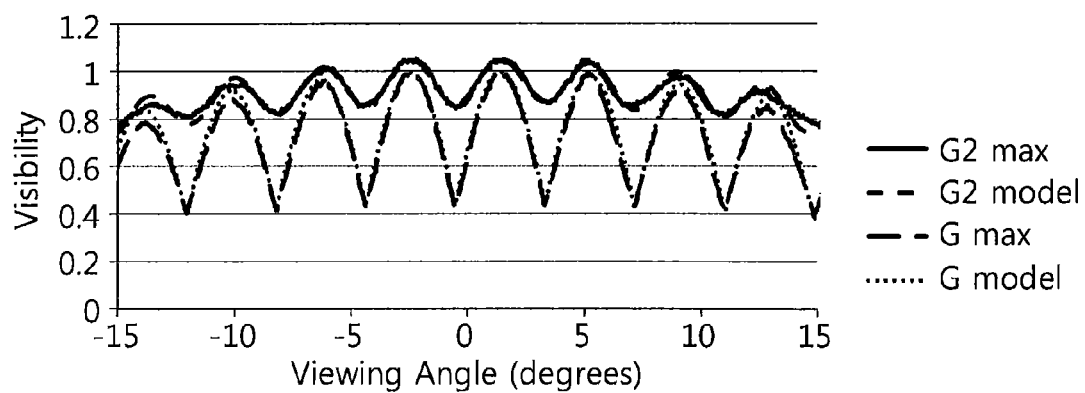
FIG. 14 illustrates a modeling graph of green subpixels, such as in the visibility graphs of FIGS. 12 and 13, according to one or more embodiments.

FIG. 14 illustrates a modeling graph of green subpixels, such as in the visibility graphs of FIGS. 12 and 13, according to one or more embodiments.

In FIG. 14, a line G max indicates visibility information associated green, among the visibility information illustrated in FIG. 12, and a line G2 max indicates visibility information associated with green, among the visibility information illustrated in FIG. 13.

A line G model indicates visibility information obtained by applying a cosine function to the line G max, and a line G2 model indicates visibility information obtained by applying a cosine function to the line G2 max. An image processing apparatus may determine a signal adjustment ratio associated with a luminance value of a subpixel, based on a similarity between the line G max and the line G model, and a similarity between the line G2 max and the line G2 model.

Accordingly, a signal level of each subpixel included in a display may be adjusted to be uniform or normalized. That is, the signal level of each pixel may be adjusted to be uniform generally and thus, content may be displayed using original luminance and color.

Figure 15:
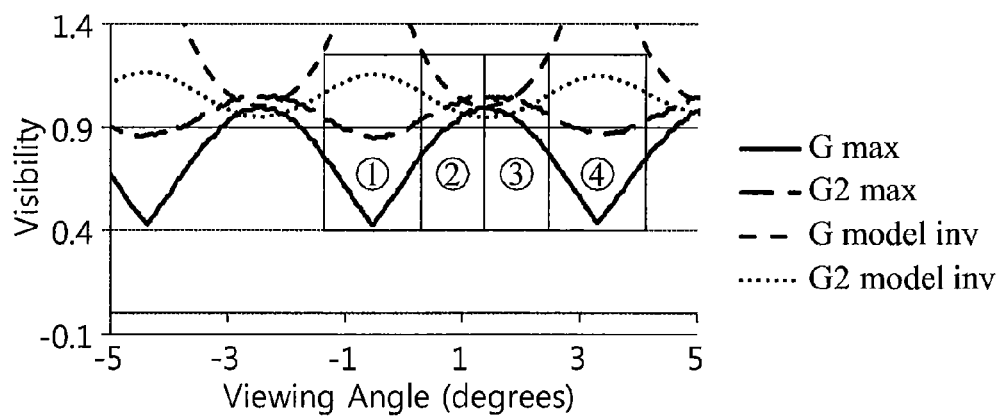
FIG. 15 illustrates a process of adjusting a signal level of a subpixel through a modeling graph, such as the modeling graph of FIG. 14, according to one or more embodiments.

FIG. 15 illustrates a process of adjusting a signal level of a subpixel through a modeling graph, such as the modeling graph of FIG. 14, according to one or more embodiments.

An image processing apparatus may select two subpixels with respect to one of red, green, and blue (R, G, B) colors when selecting four subpixels for which a predetermined direction is close to an optimal viewing direction. In this instance, the selected two subpixels may have greater differences, in terms of an optimal viewing direction and a displaying direction of a subpixel, when compared to the other subpixels. For example, two red subpixels, a single green subpixel, and a single blue subpixel may be selected, a single red subpixel, two green subpixels, and a single blue subpixel may be selected, or a single red subpixel, a single green subpixel, and two blue subpixels may be selected.

For example, when a viewing direction of a viewer is positioned in an area ② and an area ③, a single green subpixel may be selected, and a response characteristic similar to the line G max may be derived. When the viewing direction of the viewer is positioned in an area ① and an area ④, two green subpixels may be selected, and a response characteristic similar to the line G2 max may be derived. That is, when it is assumed that a single parabola corresponds to a single subpixel, a single subpixel may be selected in the area ② and the area ③. However, since two parabolas are included in the area ① and the area ④, two neighboring subpixels in an identical color may be selected in the area ① and the area ④.

In order to correct a signal level of a subpixel using the response characteristics, a line G model inversion and a line G2 model inversion may be determined based on a result of modeling. The determined line G model inversion may be used as the signal adjustment ratio for correcting the signal level of the subpixel when the viewing direction of the viewer is positioned in the area ② and the area ③. The determined line G2 model inversion may be used as the signal adjustment ratio for correcting the signal level of the subpixel when the viewing direction of the viewer is positioned in the area ① and the area ④.

In this instance, the image processing apparatus may use a single signal adjustment function. The signal adjustment function may be determined to be a function that uses a function value of the line G2 model inversion as a signal adjustment ratio in the area ① and the area ④, and a function value of the line G model inversion as the signal adjustment ratio in the area ② and the area ③. In this instance, since a signal level of the subpixel may not be adjusted to a value greater than "1," a maximum value of the signal adjustment ratio may be normalized to be "1" in the determined signal adjustment function. Accordingly, an area, among the area ①, the area ②, the area ③, and the area ④, in which the viewing direction of the viewer is positioned may be determined based on a position of an eye of the viewer. A maximum luminance value of a subpixel associated with a corresponding area may be reduced by a value corresponding to a ratio determined by one of the line G model inversion, and the line G2 model inversion, based on the determined area.

Figure 16:
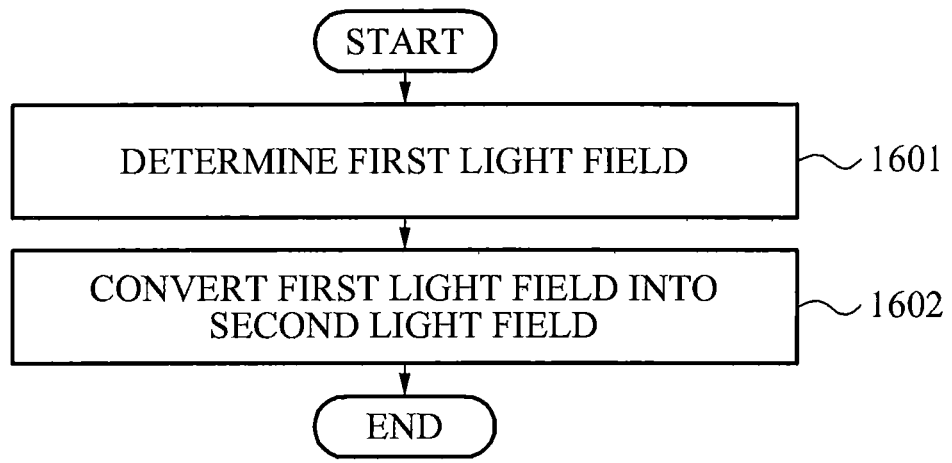
FIG. 16 illustrates an image processing method, according to one or more embodiments.

FIG. 16 illustrates an image processing method, according to one or more embodiments.

Referring to FIG. 16, in operation 1601, an image processing apparatus may determine which light field corresponds to the position of the eye of the viewer, i.e., which view image the should be seen by the viewer. For example, the image processing apparatus may identify the light field using a representative ray corresponding to a central ray that may be perceived by the viewer, among central rays output from a subpixel included in the display, based on the position of the eye of the viewer.

In operation 1602, the image processing apparatus may convert the identified light field into a light field associated with content to be displayed on the display, based on the position of the eye of the viewer. For example, the image processing apparatus may generate reference information of the subpixel, based on the position of the subpixel included in the display, and the position of the eye of the viewer. The image processing apparatus may convert the identified light field into the light field associated with content to be displayed on the display, using the reference information and the representative ray.

In particular, the image processing apparatus may convert the identified light field into the light field associated with content to be displayed on the display, based on a determined difference of an angle of the representative ray and an angle of a virtual line connecting the position of the subpixel and the position of the eye of the viewer. Here, the virtual line may refer to the reference information of the subpixel. In this instance, the reference information of the subpixel may include reference information based on a horizontal position of the subpixel and a horizontal position of the eye of the viewer. Also, the reference information of the subpixel may include reference information based on a vertical position of the subpixel and a vertical position of the eye of the viewer.

In this instance, the process of converting the identified light field may be performed by rendering a subpixel. In particular, the process of converting the identified light field may be performed based on an angle of the virtual line and an angle of the representative ray. The image processing apparatus may adjust a brightness value for each pixel, by applying the difference between the angle of the virtual line and the angle of the representative ray to visibility information set for each subpixel. The processing of converting the identified light field may be performed in real time with respect to both a left eye and a right eye of the viewer.

Figure 17:
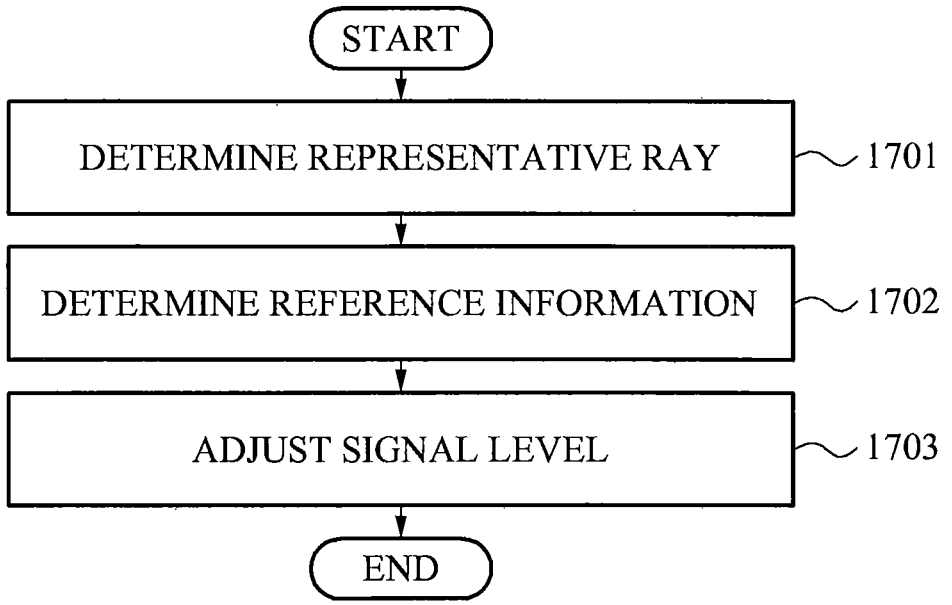
FIG. 17 illustrates an image processing method, according to one or more embodiments.

FIG. 17 illustrates an image processing method, according to one or more embodiments.

Referring to FIG. 17, in operation 1701, an image processing apparatus may determine a representative ray of a subpixel included in a display, based on a position of an eye of a viewer. For example, the image processing apparatus may determine, among central rays output from the subpixel through an optical filter, a central ray that may be perceived by the viewer to be the representative ray, based on the position of the eye of the viewer.

Here, the central ray may be output from the subpixel through a center point of the optical filter, for example, in a direction indicating a maximum level of brightness. The representative ray may include a central ray that is identical to or most adjacent to a direction from a position of the subpixel to the position of the eye of the viewer.

In operation 1702, the image processing apparatus may determine reference information, based on the position of the subpixel and the position of the eye of the viewer. For example, the image processing apparatus may determine a virtual line connecting the position of the subpixel and the position of the eye of the viewer to be the reference information. In this instance, the image processing apparatus may determine the reference information, using at least one of a virtual line connecting a horizontal position of the subpixel and a horizontal position of the eye of the viewer, and a virtual line connecting a vertical position of the subpixel and a vertical position of the eye of the viewer.

In operation 1703, the image processing apparatus may adjust a signal level of the subpixel, using the representative ray and the reference information. For example, the image processing apparatus may adjust the signal level of the subpixel, based on a difference between an angle of the representative ray and an angle of the reference information. The image processing apparatus may adjust a brightness value of each subpixel, by applying the difference between the angle of the representative ray, and an angle of a virtual line corresponding to the reference information to visibility information set for each subpixel. The process of rendering the subpixel may be performed in real time with respect to both a left eye and a right eye of the viewer.

The image processing unit may adjust the signal level of the subpixel with respect to the left eye of the viewer or the right eye of the viewer, based on whether content displayed through the subpixel is visible to at least one of the left eye and the right eye of the viewer.

One or more embodiments described above relate to a process of adjusting a subpixel based on a position of an eye of a viewer, with respect to a light field display apparatus including a multi-view display apparatus, an integral imaging apparatus, and the like. The light field display apparatus may use an optical filter, for example, a lenticular lens, a micro lens array, a barrier array, or the like, having a characteristic that a ray in a main area is regularly repeated in an adjacent area for parallax effects, for example. Also, the light field display apparatus may use an apparatus, for example, a projector that projects light emitted from a pixel or a subpixel in a predetermined direction.

The light field display apparatus using the optical filter, for example, the lenticular lens, the micro lens, the barrier array, or the like, may use a repetitive parallax characteristic of a sub-area, using the characteristic of a viewing area repeating, although the main area is narrowed. Through the process described above, a broad viewing area may be secured while saving ray resources by tracking a viewer. In addition, crosstalk effects between rays caused by rays adjacent to a ray desired to be observed may be prevented, using such an optical filter.

Also, by adaptively rendering a subpixel by detecting a position of an eye of a viewer, the viewer may view a 3D image of greater than a predetermined quality, irrespective of a position of the viewer, without a need of setting an optimal viewing distance based on the position of the viewer.

In one or more embodiments, any apparatus, system, and unit descriptions herein include one or more hardware devices or hardware processing elements. For example, in one or more embodiments, any described apparatus, system, and unit may further include one or more desirable memories, and any desired hardware input/output transmission devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A display apparatus, comprising:
   a light field determining unit to identify a first light field to be presented to a viewer, based on a determined position of the viewer to be viewing content to be displayed on a display; and
   a light field converting unit to convert the identified first light field into a light field associated with the content to be displayed on the display based on the determined position of the viewer.

2. The apparatus of claim 1, wherein the light field determining unit identifies the first light field based on a representative ray corresponding to a central ray that is perceived by the viewer, among central rays output from a subpixel included in the display, based on the determined position of the viewer.

3. The apparatus of claim 2, wherein
   central rays are rays output from the subpixel in directions resulting in respective output maximum levels of brightness, and
   the representative ray is a central ray, of the central rays, that is determined most incident to the determined position of the viewer.

4. The apparatus of claim 2, wherein the light field converting unit generates reference information of the subpixel included in the display, based on a position of the subpixel and the position of the viewer, and converts the identified first light field into the light field associated with the content to be displayed on the display based on the reference information and the representative ray.

5. The apparatus of claim 4, wherein the reference information of the subpixel comprises at least one of reference information based on a horizontal position of the subpixel and a horizontal position of an eye of the viewer, and reference information based on a vertical position of the subpixel and a vertical position of the eye of the viewer.

6. The apparatus of claim 2, wherein central rays of the subpixel are output in predetermined directions through an optical filter disposed in front of the display.

7. The apparatus of claim 2, wherein, central rays of the subpixel are predetermined to be output in at least one direction based on a direction of a ray generated from an optical filter disposed behind the display, such that the representative ray is selected from among the central rays corresponding to the at least one direction.

8. The apparatus of claim 1, wherein the light field converting unit renders a subpixel by increasing visibility information based on a maximum brightness value set for each subpixel.

9. The apparatus of claim 1, wherein
   the light field converting unit maintains an original brightness value of a subpixel when a brightness value of the subpixel is increased to a maximum value, or
   the light field converting unit reduces the brightness value of the subpixel in proportion to a case in which the brightness value of the subpixel is increased to the maximum value, when the brightness value of the subpixel is increased to a value less than the maximum value.

10. A display apparatus, comprising:
    a representative ray determining unit to determine a representative ray of a subpixel included in a display, based on a determined position of a viewer;
    a reference information determining unit to determine reference information based on the determined position of the viewer and a position of the subpixel; and a subpixel rendering unit to adjust a signal level of the subpixel based on the representative ray and the reference information.

11. The apparatus of claim 10, wherein the representative ray determining unit determines, from among central rays output from the subpixel through an optical filter, a central ray that is to be perceived by the viewer to be the representative ray of the subpixel, based on the determined position of the viewer.

12. The apparatus of claim 11, wherein
the central rays are rays output from the subpixel in directions resulting in respective output maximum levels of brightness, and
the representative ray is a central ray, of the central rays, that is determined most incident to the determined position of the viewer.

13. The apparatus of claim 10, wherein the reference information determining unit determines a virtual line connecting the position of the subpixel and the determined position of the viewer to be the reference information.

14. The apparatus of claim 13, wherein the reference information determining unit determines the reference information, using at least one of a virtual line connecting a horizontal position of the subpixel and a horizontal position of an eye of the viewer, and a virtual line connecting a vertical position of the subpixel and a vertical position of the eye of the viewer.

15. The apparatus of claim 10, wherein the subpixel rendering unit adjusts the signal level of the subpixel based on a difference between an angle of the representative ray and an angle of the reference information.

16. The apparatus of claim 10, wherein the subpixel rendering unit adjusts the signal level of the subpixel with respect to a left eye of the viewer or a right eye of the viewer, based on whether content displayed through the subpixel is visible to at least one of the left eye and the right eye of the viewer.

17. The apparatus of claim 10, wherein, central rays of the subpixel are output in predetermined directions by an optical filter disposed in front of the display.

18. The apparatus of claim 10, wherein, central rays of the subpixel are predetermined to be output in at least one direction based on a direction of a ray generated from an optical filter disposed behind the display, such that the representative ray is selected from among the central rays corresponding to the at least one direction.

19. The apparatus of claim 10, wherein the subpixel rendering unit renders a subpixel by increasing visibility information corresponding to a maximum brightness value set for each subpixel.

20. The apparatus of claim 10, wherein
the subpixel rendering unit maintains an original brightness value of a subpixel when a brightness value of the subpixel is increased to a maximum value, or
the subpixel rendering unit reduces the brightness value of the subpixel in proportion to a case in which the brightness value of the subpixel is increased to the maximum value, when the brightness value of the subpixel is increased to a value less than the maximum value.

21. The apparatus of claim 10, further comprising:
a light field determining unit to identify a first light field to be presented to the viewer, based on a determined position of the viewer to be viewing content to be displayed on the display; and
a light field converting unit to convert the identified first light field into a light field associated with the content to be displayed on the display based on the determined position of the viewer.

22. A display method, comprising:
identifying a first light field to be presented to a viewer, based on a determined position of the viewer to be viewing content to be displayed on a display; and
converting the identified first light field into a light field associated with the content to be displayed on the display based on the determined position of the viewer.

23. The method of claim 22, wherein the determining comprises identifying the first light field based on a representative ray corresponding to a central ray that is perceived by the viewer, among central rays output from a subpixel included in the display, based on the determined position of the viewer.

24. The method of claim 23, wherein
central rays are output from the subpixel in directions resulting in respective maximum levels of brightness, and
the representative ray is a central ray, of the central rays, that is determined most incident to the determined position of the viewer.

25. The method of claim 23, wherein the converting comprises:
generating reference information of the subpixel included in the display, based on a position of the subpixel and the position of the viewer; and
converting the identified first light field into the light field associated with the content to be displayed on the display based on the reference information and the representative ray.

26. The method of claim 25, wherein the reference information of the subpixel comprises at least one of reference information based on a horizontal position of the subpixel and a horizontal position of an eye of the viewer, and reference information based on a vertical position of the subpixel and a vertical position of the eye of the viewer.

27. The method of claim 22, wherein, central rays of the subpixel are output in predetermined directions through an optical filter disposed in front of the display.

28. The method of claim 22, wherein, central rays of the subpixel are predetermined to be output in at least one direction based on a direction of a ray generated from an optical filter disposed behind the display, such that the representative ray is selected from among the central rays corresponding to the at least one direction.

29. The method of claim 22, wherein the converting comprises rendering a subpixel by increasing visibility information based on a maximum brightness value set for each subpixel.

30. The method of claim 22, wherein the converting comprises:
maintaining an original brightness value of a subpixel when a brightness value of the subpixel is increased to a maximum value; or
reducing the brightness value of the subpixel in proportion to a case in which the brightness value of the subpixel is increased to the maximum value, when the brightness value of the subpixel is increased to a value less than the maximum value.

31. A non-transitory computer-readable medium comprising computer readable code to control at least one processing device to implement the method of claim 22.

32. A display method, comprising:
determining a representative ray of a subpixel included in a display, based on a determined position of a viewer;
determining reference information based on the determined position of the viewer and a position of the subpixel; and adjusting a signal level of the subpixel based on the representative ray and the reference information.

33. The method of claim 32, wherein the determining of the representative ray comprises determining, from among central rays output from the subpixel through an optical filter, a central ray that is to be perceived by the viewer to be the representative ray of the subpixel, based on the determined position of the viewer.

34. The method of claim 33, wherein
the central rays are rays output from the subpixel in directions resulting in respective maximum levels of brightness, and
the representative ray is a central ray, of the central rays, that is determined most incident to the determined position of the viewer.

35. The method of claim 33, wherein the adjusting comprises adjusting the signal level of the subpixel with respect to a left eye of the viewer or a right eye of the viewer, based on whether content displayed through the subpixel is visible to at least one of the left eye and the right eye of the viewer.

36. The method of claim 32, wherein the determining of the reference information comprises determining a virtual line connecting the position of the subpixel and the determined position of the viewer to be the reference information.

37. The method of claim 36, wherein the determining of the reference information comprises determining the reference information, using at least one of a virtual line connecting a horizontal position of the subpixel and a horizontal position of an eye of the viewer, and a virtual line connecting a vertical position of the subpixel and a vertical position of the eye of the viewer.

38. The method of claim 32, wherein the adjusting comprises adjusting the signal level of the subpixel based on a difference between an angle of the representative ray and an angle of the reference information.

39. The method of claim 32, wherein, central rays of the subpixel are output in predetermined directions by an optical filter disposed in front of the display.

40. The method of claim 32, wherein, central rays of the subpixel are predetermined to be output in at least one direction based on a direction of a ray generated from an optical filter disposed behind the display, such that representative ray is selected from among the central rays corresponding to the at least one direction.

41. The method of claim 32, wherein the adjusting comprises rendering a subpixel by increasing visibility information corresponding to a maximum brightness value set for each subpixel.

42. The method of claim 32, wherein the adjusting comprises:
maintaining an original brightness value of a subpixel when a brightness value of the subpixel is increased to a maximum value; or
reducing the brightness value of the subpixel in proportion to a case in which the brightness value of the subpixel is increased to the maximum value, when the brightness value of the subpixel is increased to a value less than the maximum value.

43. The method of claim 32, further comprising:
identifying a first light field to be presented to the viewer, based on the determined position of the viewer to be viewing content to be displayed on the display; and
converting the identified first light field into a light field associated with the content to be displayed on the display based on the determined position of the viewer.

44. A non-transitory computer-readable medium comprising computer readable code to control at least one processing device to implement the method of claim 32.

* * * * *